Oct. 13, 1953 A. J. GRANBERG 2,655,285
LIQUID DISPENSING APPARATUS HAVING PROTECTED
QUANTITY CONTROL MECHANISM AND COUNTER
Filed Jan. 3, 1950 3 Sheets-Sheet 1
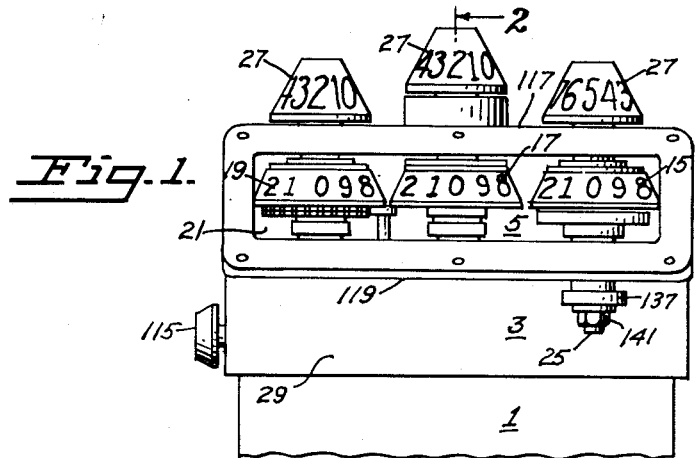
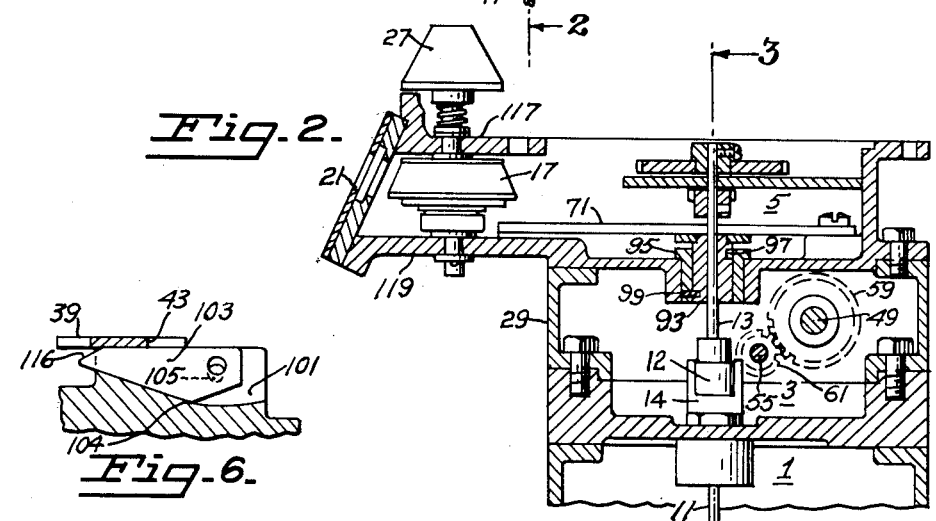
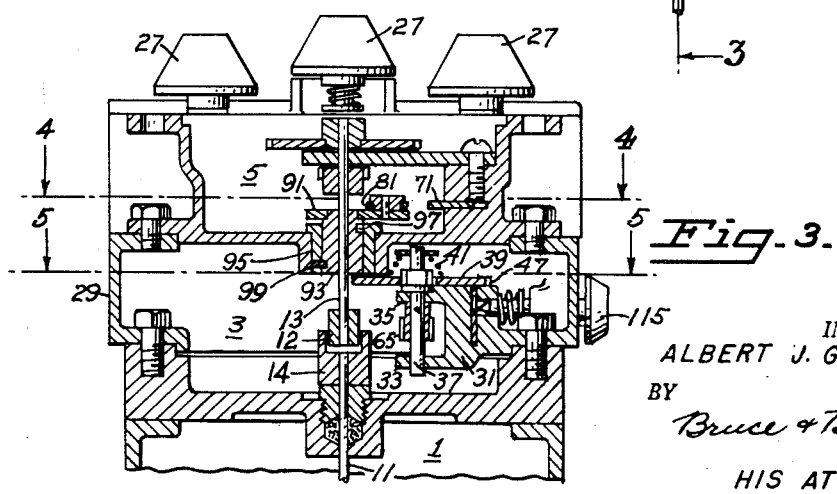
INVENTOR.
ALBERT J. GRANBERG
BY
Bruce & Brosler
HIS ATTORNEYS

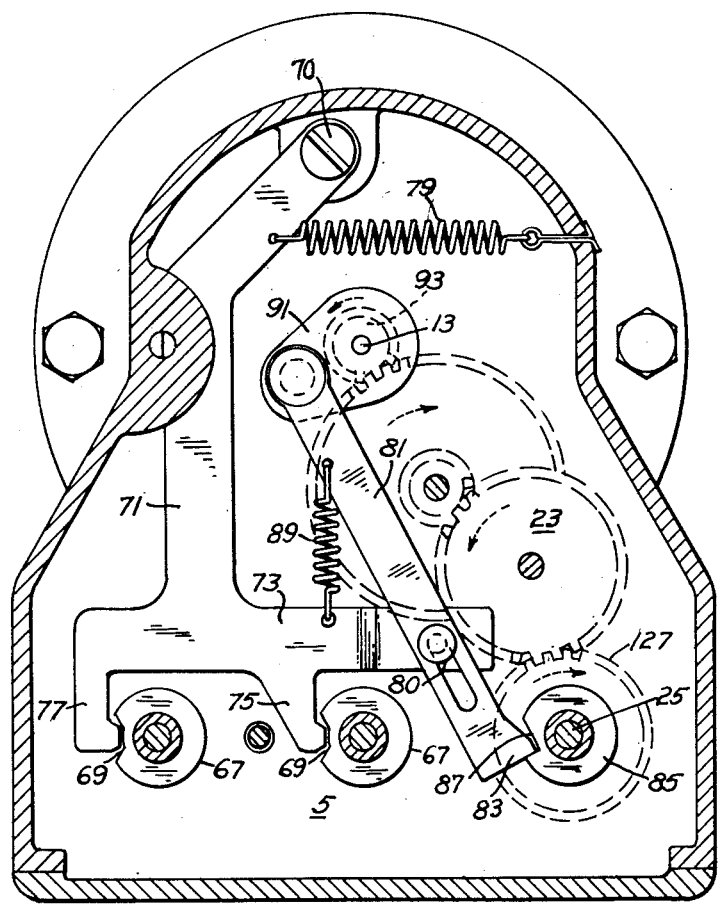

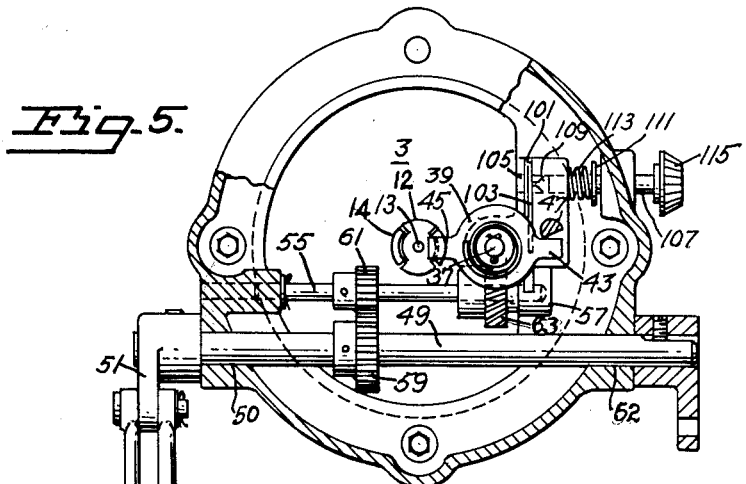

Patented Oct. 13, 1953

2,655,285

UNITED STATES PATENT OFFICE 2,655,285

LIQUID DISPENSING APPARATUS HAVING PROTECTED QUANTITY CONTROL MECHANISM AND COUNTER

Albert J. Granberg, Oakland, Calif.

Application January 3, 1950, Serial No. 136,563

8 Claims. (Cl. 222—20)

1

This invention relates to liquid measuring meters, and more particularly to a counter-head and latching assembly for association with a liquid measuring meter to effect control over the closing of a manually operable valve in a liquid flow line. The invention is particularly applicable in the dispensing of gasoline or other liquids from tank trucks wherein an operator in handling the hose, is usually too far from the liquid meter to determine the exact point of shut-off, and may, in accordance with the present invention, rely upon the counter-head to effect such shut-off when a desired quantity of the liquid has been dispensed.

It frequently happens, when exposed to wintry weather, that the latching assembly of the prior art is apt to freeze up, thereby causing the operator considerable difficultly in breaking the ice film to free the device for operation. Similar difficulty may be experienced due to clogging of the moving parts by dust or the like.

A further problem encountered in connection with meters of the type here involved, is to realize an accurate zero setting on the units indicia wheel. Such problem arises due to differences in viscosity of the liquids to be measured, but when once adjusted, the meter will continue to read accurately.

Among the objects of my invention are:

(1) To provide a novel and improved counter-head and latching assembly for operation of a liquid flow valve;

(2) To provide a novel and improved latching assembly for a counter-head which will offer little difficulty in the matter of operation, even if exposed to freezing temperatures or dusty atmospheric conditions;

(3) To provide a counter-head in which the units indicia wheel may be readily adjusted for accurate readings;

(4) To provide a counter-head and latching assembly of simplified and dependable construction.

Additional objects of my invention will be brought out in the following description of a preferred embodiment of the same, taken in conjunction with the accompanying drawings wherein—

Figure 1 is a front elevational view of a counter-head and latching assembly in which the present invention is incorporated;

Figure 2 is a view in section, taken in the plane 2—2 of Figure 1;

Figure 3 is a view in section, taken in the plane 3—3 of Figure 2;

2

Figure 4 is a view in section, taken in the plane 4—4 of Figure 3;

Figure 5 is a plan view in section, taken in the plane 5—5 of Figure 3;

Figure 6 is a detail in the structure of Figure 5;

Figure 7 is a view in section to the units indicator assembly;

Figure 8 is a view taken in the plane 8—8 of Figure 7.

An insulation to which the present invention relates primarily, involves the meter, a counter-head and a latching mechanism intermediate the meter and the counter-head. Flow of liquid through the meter is controlled by a manually openable spring loaded valve in the fluid line, the valve being latched in its open position by the latch mechanism to which it is coupled. The counter-head is pre-set to close the valve when the meter has passed a predetermind quantity of liquid.

In the specific embodiment of the invention depicted in the drawings, the meter 1 is surmounted by a latching assembly 3 which in turn supports a counter-head 5. In the liquid flow line is a normally closed spring-loaded valve 7 having a handle 9 for manually opening the valve against the action of its spring.

The shaft 11 of the meter extends upwardly for coupling to the shaft 13 of the counter-head for operating the counter mechanism, the coupling means involving a coupling element 12 at the lower end of shaft 13, dovetailing with a coupling element 14 at the upper end of the meter shaft 11.

Such counter mechanism involves a plurality of number wheels 15, 17, 19 disposed behind an observation window 21 and coupled one to the other by a conventional intermittent functioning means for maintaining a one to ten ratio between movements of adjacent wheels, whereby the first wheel 15 may be made to represent units, the second, 17, represent tens, and the third, 19, hundreds. Operation of the number wheels in response to liquid passing through the meter is realized by a suitable gear train 23 illustrated in phantom in Figure 4 as coupling the counter shaft 13 to the shaft 25 of the units wheel, the units wheel gear 127 appearing in Figure 7.

In the quantity control counter, the number wheels are numbered in reverse, and preliminary to an operation, these wheels are manually rotated by associated knobs 27 to indicate the desired amount of liquid to be discharged through the meter, so that when such quantity has been discharged, the wheels will all register zero.

The latching mechanism is enclosed within a housing 29 formed with an integral inwardly directed yoke 31 (Figure 3) having a pair of vertically spaced arms 33, 35 in which is journaled a vertically disposed shaft 37, whose upper end is non-circular and preferably of rectangular section.

Over this upper end is loosely disposed a washer 39 having a central opening of corresponding contour to cause rotation of the washer with rotation of the shaft, yet permit such washer to be tilted from a normally horizontal plane against the action of a stabilizing compression spring 41 bearing upon the upper side of the washer. The washer is formed with a pair of peripheral tabs 43, 45 extending therefrom, these being diametrically disposed in the embodiment illustrated.

Mounted on the yoke and in the path of movement of such tabs, is a stop pin 47 which rises just sufficiently to block rotation of the washer in one direction, while such washer occupies its horizontal position. A bevel at the upper end of the pin permits rotation of the washer at any time in the reverse direction. Such rotation is made responsive to swing of the valve handle in the direction of opening such valve, following which, the washer will latch behind the pin and hold the valve open.

The means for effecting such action, involves a main drive shaft 49 (Figure 5) journaled for rotation in aligned bearings 50, 52 located in the housing walls and carrying at one end externally of the housing, a crank 51. This crank is coupled to the valve handle by an adjustable link 53.

Parallel with the main drive shaft is an auxiliary shaft 55 journaled at one end in the housing wall and at its other end in a lateral extension 57 of the yoke. This shaft is coupled to the main drive shaft by a pair of spur gears 59, 61.

A spiral gear 63 on the auxiliary shaft meshes with a spiral gear 65 on the washer shaft to complete an operating connection from the valve to the washer, whereby upon opening the valve, the washer will rotate around and at the completion of the valve handle swing, one of the tabs will abut the pin and latch the valve to its open position against the restoring action of the valve spring.

Momentary tilting of the washer will free the same from restraint for at least a half rotation thereof, and thereby permit the valve to partially close to that extent. By beveling the lower advancing edge of the diametrically disposed tab, considered from the viewpoint of reverse rotation of the washer, a complete rotation of the washer will take place before it again latches. By repeated tilting of the washer, the valve may be closed by stages, which is beneficial from the viewpoint of tapering off the flow of liquid to prevent shock impulses and vibration in the associated pipe lines and couplings, and at the same time assure an accurate cut-off of liquid flow.

Such tilting of the washer is under control of the counter, and is so related to the operation of the counter that the washer is tilted at prescribed intervals beginning at some point of time prior to the completion of a discharge, when it is deemed advisable to taper off.

Associated with the tens and hundreds number wheels for rotation therewith is a disk 67 (Figure 4) having a peripheral radial notch 69 formed therein, such disks being so oriented as to face in the same direction when these number wheels each indicate zero.

Pivotally anchored at a remote point in the housing as by a pivot screw 70 is a lever 71 having a cross-arm 73 from which extend a pair of spaced prongs 75, 77, one terminating adjacent the disk of the tens wheel and the other terminating adjacent the periphery of the disk of the hundreds wheel. A tension spring 79 normally biases the lever to hold these prongs in pressure contact with their associated disks, whereby when the notches 69 line up, the lever, unless otherwise precluded, will be free to move into the notches as illustrated in Figure 4.

Slidably mounted on and transversely of the cross-arm, as by a pin and slot connection 80, and forming part of the spring-biased lever, is a link 81 terminating at one end in a prong 83 facing a disk 85 associated with the units wheel, this disk having a notch 87 shaped for entrance by said prong just prior to the units wheel reaching its zero indication. In this, the link is aided by a tension spring 89 disposed between the lower half of the link and the cross-arm.

The remote end of this link 81 is connected to a crank-arm 91 which in turn is fixed to the upper end of a bushing 93 which passes axially through the floor of the counter-head and provides axial passage for the counter shaft. The bushing slidably fits a fixed sleeve 95. A coarse spiral groove 97 on the external side of the bushing receives a fixed pin 99 anchored on the inner side of the sleeve, whereby rotational movement of the bushing, as when the units wheel rotates to zero following engagement of the link prong 83 in the units wheel notch 87, will cause the bushing to ride down on the sleeve pin. By disposing the tilt washer with one of its tabs under the bushing, as depicted in Figure 3, such downward movement of the bushing will tilt the washer and free it from restraint.

If such freeing of the washer permits only a partial closing of the valve, liquid will continue to be discharged through the meter at reduced rate, and the units wheel will continue rotation also at reduced rate. Such continued rotation of the units wheel will accordingly force the prong 83 out of the notch 87 until the next time around. In the meantime the valve will have been latched in its partially closed position, and the bushing retracted for the next tilting operation. This performance is repeated until the valve ultimately closes and stops rotation of the units wheel.

More frequent tilting operations of the bushing may be realized by the provision of a second notch in the disk 85, diametrical to the first notch, and this will have the effect of closing off the valve within a shorter period of time.

It will be understood, of course, that the prong 83 cannot enter the notch of the disk associated with the units wheel until the tens wheel and hundreds wheel have reached their zero positions, and when they do, it means that the time has arrived when the flow through the meter should be tapered off and the valve restored to its closed condition.

The operation of the mechanism is entirely automatic, and by predetermined design, the valve may be automatically shut down in one, two or more stages as desired.

During the course of an operation, should one desire to interrupt the discharge and re-set the valve to its closed position, manually operable means are provided for tilting the washer to effect such result. To this end, a rather narrow groove 101 is provided in the body of the yoke and extending beneath the washer, such groove tapering as to depth to receive a wedge-shaped strip 103 having an intermediate fulcrum point 104 and lying with its tapered end beneath the washer adjacent the latching tab, while the other end of the strip is provided with an opening therethrough whose center lies slightly above the axis of a transverse passage 105 through the body of the yoke.

A rod 107, slidably supported in the wall of the housing in line with the passage 105, enters this passage and terminates at its inner end in a tapered point 109 which enters the opening in the wedge-shaped strip. Such rod carries a washer 111 thereon adjacent the inner side of the housing wall, and a coil spring 113 surrounding the rod between such washer and the body of the yoke, normally urges such rod to its outermost position. At its outer exposed end, the rod carries a knob 115.

Whenever it is desired to manually upset the latching mechanism to restore the valve to its normally closed position, the operator pushes against such knob to force the rod into the opening in the wedge-shaped strip. The tapered end of the rod in passing through the opening serves to depress that end of the strip about the fulcrum point and thereby raise the other end, thus to tilt the washer so that it may readily pass over the latch pin. Under these conditions, and so long as the knob is held in, the valve is free to restore itself to its closed position. A bevel 116 at the lifting end of the strip serves to guide the tabs over the blocking pin for this purpose.

Due to the differences in viscosity of liquids to be measured by apparatus of the type described, it often happens upon the installation of new equipment, that the units wheel will not register exactly on zero indication when the valve has completely shut itself down. This calls for a slight compensating adjustment of the units wheel, whereby thereafter, the units wheel will always register exactly on the zero indication in the measurement of such liquid for which the equipment was installed.

The units wheel shaft 25 extends through upper and lower walls 117, 119, respectively, of the counter, and at its upper end such shaft carries the control knob 27 which is pinned to the shaft. Within the housing, the shaft carries a bushing 121 having a flange 123 at its lower end. Over this bushing is slidably fitted the units wheel 15 which is fixed to the shaft by a pin going through the bushing, whereby the bushing becomes part of the units wheel assembly. The underside of the units wheel is recessed and lined with a layer 125 of suitable clutch material.

Supported on the lower end of the bushing is the drive gear 127 forming part of the gear train 23 to the units wheel. This gear carries on its upper surface a disk 129 to which are fastened a pair of spring-biased clutch fingers 131 which are normally urged outwardly against the rim of the clutch recess by associated anchored biasing springs 133. Adapted to engage the lower end of the units wheel bushing is the notched disk 85 which is provided with a cylindrical extension 135 passing through the lower wall of the counter. A knurled disk 137 is fixed to the lower end of this cylindrical extension, as by a pin 139, and a nut 141 threaded upon the lower end of the shaft, serves to hold the disk 85 in pressure locking engagement with the lower end of the units wheel bushing.

In effecting the aforementioned adjustment of the zero reading of the units wheel, the nut 141 is first loosened while holding the knob 27 and units wheel assembly against rotation. Following such loosening of the nut, the knob is then rotated until the zero indication on the units wheel is properly located, after which the nut is tightened while holding the knurled disk 137 to preclude displacement thereof with the notched disk 85. This is important as the notched disk must maintain the same position it occupied at the last closing of the valve.

From the above description of my invention in its preferred form, it will be apparent that the same fulfills the objects recited therefor. The rotational movement of the main drive shaft and the auxiliary shaft associated therewith, as distinguished from the sliding movements of shafts in prior art devices, will greatly facilitate the breaking of any ice film which may form over the equipment when exposed to inclement wintry weather conditions. The leverage afforded by the crank 51 will further facilitate the realization of such objective. By employing reduction gearing between the main drive shaft and the tilting washer shaft, the load on the tilt washer will be minimized. The means for adjusting the units wheel to accommodate the counter to liquids of different viscosities is simple and dependable and the adjustments may be made quickly and accurately.

Accordingly, while I have described my invention in its preferred form and in considerable detail, I do not wish to be limited in my protection to such details as I have illustrated and described, except as may be necessitated by the appended claims.

I claim:

1. For use in a line employing a liquid meter and a spring loaded valve having a handle for adjusting said valve to a predetermined position; restraining mechanism adapted to hold said spring loaded valve in such a predetermined position against spring action of said valve, said restraining mechanism including a housing having aligned bearings, a releasable latch in said housing, a shaft journaled for rotation in said aligned bearings, means operatively coupling said shaft to said releasable latch, and means linking said valve handle to said shaft for rotating said shaft in response to adjustment of said valve to said predetermined position, said means involving a crank on one end of said shaft and a link intermediate said crank and said handle.

2. For use in a line employing a liquid meter and a spring loaded valve having a handle for adjusting said valve to a predetermined position; restraining mechanism adapted to hold said spring loaded valve in such a predetermined position against spring action of said valve, said restraining mechanism including a housing having aligned bearings, a releasable latch in said housing involving a vertical shaft, a tiltable washer mounted on said vertical shaft for rotation therewith and having a plurality of tabs extending from the edge thereof, means in the path of rotation of said tabs when said washer occupies a horizontal position for restraining rotational movement of said washer in one direction, means for causing said tabs to ride over said restraining means when said washer is rotated in the reverse direction, a main drive shaft journaled for rotation in said aligned bearings, means coupling said main drive shaft to said vertical washer shaft to transmit rotational movement of said main drive shaft to said washer shaft in such reverse direction, and means linking said valve handle to said main drive shaft for rotating said main drive shaft in response to adjustment of said valve to said predetermined position, said valve handle linking means involving a crank on one end of said main drive shaft and a link intermediate said crank and said handle.

3. For use in a line employing a liquid meter and a spring loaded valve having a handle for adjusting said valve to a predetermined position; restraining mechanism adapted to hold said spring loaded valve in such a predetermined position against spring action of said valve, said restraining mechanism including a housing having aligned bearings, a releasable latch in said housing involving a vertical shaft, a tiltable element mounted on said vertical shaft for rotation therewith, means in the path of rotation of said tiltable element when said element occupies a horizontal position for restraining rotational movement of said element in one direction, means for causing said tabs to ride over said restraining means when said washer is rotated in the reverse direction, a main drive shaft journaled for rotation in said aligned bearings, means coupling said main drive shaft to said vertical shaft to transmit rotational movement of said main drive shaft to said vertical shaft in such reverse direction, and means linking said valve handle to said main drive shaft for rotating said main drive shaft in response to adjustment of said valve to said predetermined position, said valve handle linking means involving a crank on one end of said main drive shaft and a link intermediate said crank and said handle; and means for tilting said element at a predetermined point in the operation of said meter to release said element from restraint and permit movement of said valve in a direction toward its prior position, said tilting means including a quantity control counter having units, tens and hundreds number wheel assemblies responsively connected to the shaft of said meter, said number wheel assemblies having notches alignable when such assemblies simultaneously indicate zero, and means engageable in said notches as the units wheel assembly notch approaches alignment with the other two and responsive to the remaining travel of said units wheel assembly notch to the position of alignment for bearing against said tiltable element to tilt the same and release it from restraint.

4. For use in a line employing a liquid meter and a spring loaded valve having a handle for adjusting said valve to a predetermined position; restraining mechanism adapted to hold said spring loaded valve in such a predetermined position against spring action of said valve, said restraining mechanism including a housing having aligned bearings, a releasable latch in said housing involving a vertical shaft, a tiltable element mounted on said vertical shaft for rotation therewith, means resiliently holding said tiltable element in a substantially horizontal position, means in the path of rotation of said tiltable element when said element occupies such horizontal position for restraining rotational movement of said element in one direction, means for causing said tiltable element to ride over said restraining means when said tiltable element is rotated in the reverse direction, a main drive shaft journaled in said aligned bearings, means coupling said main drive shaft to said vertical shaft to transmit rotational movement of said main drive shaft to said vertical shaft in such reverse direction, said main drive shaft coupling means involving a reduction gear train, and means linking said valve handle to said main drive shaft for rotating said main drive shaft in response to adjustment of said valve to said predetermined position, said valve handle linking means involving a crank on one end of said shaft and a link intermediate said crank and said handle, and means for tilting said element at a predetermined point in the operation of said meter to release said element from restraint and permit movement of said valve in a direction toward its prior position, said tilting means including a quantity control counter having units, tens and hundreds number wheel assemblies responsively connected to the shaft of said meter, said number wheel assemblies having notches alignable when such assemblies simultaneously indicate zero, and means engageable in said notches as the units wheel assembly notch approaches alignment with the other two and responsive to the remaining travel of said units wheel assembly notch to the position of alignment for bearing against said element to tilt the same and release it from restraint.

5. For use in a line employing a liquid meter and a spring loaded valve having a handle for adjusting said valve to a predetermined position; restraining mechanism adapted to hold said spring loaded valve in such a predetermined position against spring action of said valve, said restraining mechanism including a housing having aligned bearings, a releasable latch in said housing involving a vertical shaft, a tiltable washer mounted on said vertical shaft for rotation therewith and having a plurality of tabs extending from the edge thereof, means resiliently holding said tiltable washer in a substantially horizontal position, a pin in the path of rotation of said tabs when said washer occupies such horizontal position for restraining rotational movement of said washer in one direction, said pin having a bevel at its upper edge for causing said tabs to ride over said pin when said washer is rotated in the reverse direction, a main drive shaft journaled in said aligned bearings, means coupling said main drive shaft to said vertical washer shaft to transmit rotational movement of said main drive shaft to said washer shaft in such reverse direction, said main drive shaft coupling means involving a reduction gear train, and means linking said valve handle to said main drive shaft for rotating said main drive shaft in response to adjustment of said valve to said predetermined position, said valve handle tilting means involving a crank on one end of said main drive shaft and a link intermediate said crank and said handle; and means for tilting said washer at a predetermined point in the operation of said meter to release said washer from restraint and permit movement of said valve in a direction toward its prior position, said washer tilting means including a quantity control counter having units, tens and hundreds number wheel assemblies responsively connected to the shaft of said meter, said number wheel assemblies having notches alignable when such assemblies simultaneously indicate zero, and means engageable in said notches as the units wheel assembly notch approaches alignment with the other two and responsive to the remaining travel of said units wheel assembly notch to the position of alignment, for bearing against a tab on said washer to tilt the same and release it from restraint.

6. A units wheel assembly for a counter associated with a liquid meter, comprising a shaft within said counter, a units wheel affixed to said shaft, a gear on said shaft, a notched disk on said shaft, said units wheel, gear and notched disk being disposed within said counter releasable means for frictionally pressure locking said notched disk to said units wheel, and means outside said counter and in physical communication with said notched disk for manually restraining said notched disk from accidental movement when said releasable means is loosened to make an adjustment of said units wheel.

7. A units wheel assembly for a counter associated with a liquid meter, comprising a shaft within said counter, a units wheel affixed to said shaft, a gear on said shaft, clutch means normally coupling said gear to said units wheel, a notched disk on said shaft, said units wheel, gear, clutch means and notched disk being disposed within said counter, releasable means for frictionally pressure locking said notched disk to said units wheel, and means outside said counter and in physical communication with said notched disk for manually restraining said notched disk from accidental movement when said releasable means is loosened to make an adjustment of said units wheel.

8. A units wheel assembly for a counter associated with a liquid meter, comprising a shaft within said counter, a units wheel affixed to said shaft, a gear on said shaft, clutch means normally coupling said gear to said units wheel, a notched disk on said shaft adjacent said gear, said units wheel, gear, clutch and notched disk being disposed within said counter, releasable means for frictionally pressure locking said notched disk to said units wheel, and means for manually restraining said notched disk from accidental movement when said releasable means is loosened to make an adjustment of said units wheel, said means including an axial portion extending to the outside of said counter and terminating in a knurled disk for grasping with one hand while making such adjustment.

ALBERT J. GRANBERG.

References Cited in the file of this patent

UNITED STATES PATENTS

| Number | Name | Date |
| --- | --- | --- |
| 809,127 | McDonald et al. | Jan. 2, 1906 |
| 1,592,568 | Orth | July 13, 1926 |
| 1,615,399 | Orth | Jan. 25, 1927 |
| 1,948,946 | Smith et al. | Feb. 27, 1934 |
| 2,174,480 | Raymond | Sept. 26, 1939 |
| 2,196,805 | Berck | Apr. 9, 1940 |
| 2,493,464 | Nelson | Jan. 3, 1950 |

FOREIGN PATENTS

| Number | Country | Date |
| --- | --- | --- |
| 600,957 | Great Britain | Apr. 23, 1948 |